US012508734B2

(12) United States Patent
Liu

(10) Patent No.: US 12,508,734 B2
(45) Date of Patent: Dec. 30, 2025

(54) INTUITIVE ELECTRIC LIFTING DEVICE FOR WOODWORKING TRIMMING MACHINE

(71) Applicant: SUPER POWER TOOLS CO., LTD., Taichung (TW)

(72) Inventor: Yu-Chun Liu, Taichung (TW)

( * ) Notice: Subject to any disclaimer, the term of this patent is extended or adjusted under 35 U.S.C. 154(b) by 350 days.

(21) Appl. No.: 18/447,140

(22) Filed: Aug. 9, 2023

(65) Prior Publication Data

US 2025/0050529 A1 Feb. 13, 2025

(51) Int. Cl.

| | |
|---|---|
| ***B27C 5/02*** | (2006.01) |
| ***B27C 1/14*** | (2006.01) |
| ***B27C 5/10*** | (2006.01) |
| *B27C 9/02* | (2006.01) |

(52) U.S. Cl.

CPC .................. *B27C 5/02* (2013.01); *B27C 1/14* (2013.01); *B27C 5/10* (2013.01); *B27C 9/02* (2013.01); *Y10T 409/306608* (2015.01); *Y10T 409/307952* (2015.01); *Y10T 409/308176* (2015.01)

(58) Field of Classification Search

CPC .... B27C 1/14; B27C 5/02; B27C 5/10; B27C 9/02; Y10T 409/306608; Y10T 409/307952; Y10T 409/308176

USPC .................. 144/135.2, 136.95, 286.1, 286.5; 409/182, 206, 210

See application file for complete search history.

(56) References Cited

U.S. PATENT DOCUMENTS

| | | | | |
|---|---|---|---|---|
| 4,909,293 A * | 3/1990 | Maioli | ............... | B23Q 11/0866 144/135.2 |
| 6,792,984 B2 * | 9/2004 | Fontaine | ................... | B27C 5/10 144/135.2 |
| 2005/0079025 A1 * | 4/2005 | Oberheim | ................. | B27C 5/10 409/182 |
| 2006/0045643 A1 * | 3/2006 | Petersen | ................... | B27C 5/02 144/136.95 |
| 2020/0061864 A1 * | 2/2020 | Wenning | ................... | B27C 5/02 |

* cited by examiner

*Primary Examiner* — Jared O Brown

(74) *Attorney, Agent, or Firm* — Egbert, McDaniel & Swartz, PLLC

(57) ABSTRACT

An intuitive electric lifting device for a woodworking trimming machine comprises an assembly base, a plurality of guide support rods, a driving motor, a screw and an intuitive control interface, wherein the intuitive control interface is electrically connected to the driving motor through a signal line. The intuitive control interface includes a casing, a display touch interface and a rotary-push button. The rotary-push button is arranged on one side of the display touch interface, protruding from the control side. The values are adjusted when the rotary-push button is rotated, and the action is executed or canceled when it is pressed. A mode status display box is provided, which specifically displays the adjusted values according to the selected control mode of the display touch interface and the rotation information of the rotary-push button in the control mode.

2 Claims, 5 Drawing Sheets

INTUITIVE ELECTRIC LIFTING DEVICE FOR WOODWORKING TRIMMING MACHINE

CROSS-REFERENCE TO RELATED U.S. APPLICATIONS

Not applicable.

BACKGROUND OF THE INVENTION

1. Field of the Invention

The present invention relates generally to a peripheral device of a woodworking trimming machine; and more particularly to the structure type of an innovative intuitive electric lifting device for woodworking trimming machine.

2. Description of Related Art Including Information Disclosed Under 37 CFR 1.97 and 37 CFR 1.98

In practical use of a woodworking trimming machine, it can be held in the user's hand and applied to the workpiece for material removal operation, and the woodworking trimming machine can be fixed and assembled on a working table, and the rotating tool is turned upwards, and then the user moves the workpiece on the working table for material removal.

Assuming that the user adopts the operation method of assembling the woodworking trimming machine on the working table, there will be the problem of the control and identification of the cutting tool feed state. The present practice in related circles is that a set of hand crank is assembled on the working table structure. The hand crank can drive the assembly base of the woodworking trimming machine to move up and down, so as to adjust the height of the tool. The specific structure is that a sliding assembly base is installed with a plurality of guide support rods at the bottom of the working table. The assembly base has a screw hole, and a screw is provided at the bottom of the working table, so that the screw is screwed into the screw hole of the assembly base. One end of the screw extends to the surface of the working table to form a driven part, and the hand crank is inserted into the driven part, so that the rotation of the hand crank can drive the assembly base to move up and down.

However, the actual feed state of the cutting tool cannot be directly recognized by the user, it must be confirmed by measuring the material removal position of the workpiece, so that it is still non-ideal in usability, there is still room for improvement.

In view of the problems in the technologies in relation to said conventional woodworking trimming machine, how to develop an innovative structure which is more ideal and practical is the goal and direction to be thought about and broken through by related industries. In view of this, the inventor made careful design and evaluation for said goal based on years' experience in manufacturing, development and design of related products, and finally obtained the invention with practicability.

BRIEF SUMMARY OF THE INVENTION

The main object of the present invention is to provide an intuitive electric lifting device for the woodworking trimming machine. The technical problem to be solved is to think about, innovate and break through how to develop a novel intuitive electric lifting device for woodworking trimming machine with more ideal practicability. The intuitive electric lifting device is used for assembling the existing woodworking trimming machine on the working table, so as to adjust and identify the feed state of the woodworking trimming machine. The woodworking trimming machine includes a machine body and a rotary cutter.

Based on said object, the technical feature of problem solving of the present invention is that the intuitive electric lifting device comprises an assembly base, including an assembly part facing the bottom of the working table, a plurality of guide sliding holes and a screw hole arranged in the assembly part. A plurality of guide support rods are provided, each of which has a positioning end and a protruding section, wherein the positioning end is fixed to the bottom of the working table, the protruding section extends from the bottom of the working table to a set length, and the guide sliding holes of the assembly base are respectively fitted over the protruding sections of the guide support rods. A driving motor is assembled on the bottom of the working table. A screw with a driven end and an extension rod section is provided, wherein the driven end is connected to the driving motor, the extension rod section extends from the bottom of the working table to a length, and the length matches the set length of the protruding section, and the screw hole at the assembly base is screwed in the extension rod section. An intuitive control interface is electrically connected to the driving motor through a signal line. The intuitive control interface comprises a casing, a display touch interface and a rotary-push button, wherein the casing has a control side, the display touch interface is arranged on the control side, the rotary-push button is arranged on one side of the display touch interface, protruding from the control side, the up/down value is adjusted when the rotary-push button is rotated, and the action is executed or canceled when it is pressed, the display touch interface includes a mode switching unit, a continuous up key and a continuous down key. Areal-time interaction dialog box specifically displays the adjusted values according to the selected control mode of the display touch interface and the rotation information of the rotary-push button in the control mode.

In terms of the effects and advantages of the present invention, the setting of the intuitive control interface makes it easier for the user to identify and control the adjusted interface, so as to achieve practical and progressive benefit of greatly improving the usability of the woodworking trimming machine.

DETAILED DESCRIPTION OF THE INVENTION

Figure 1:
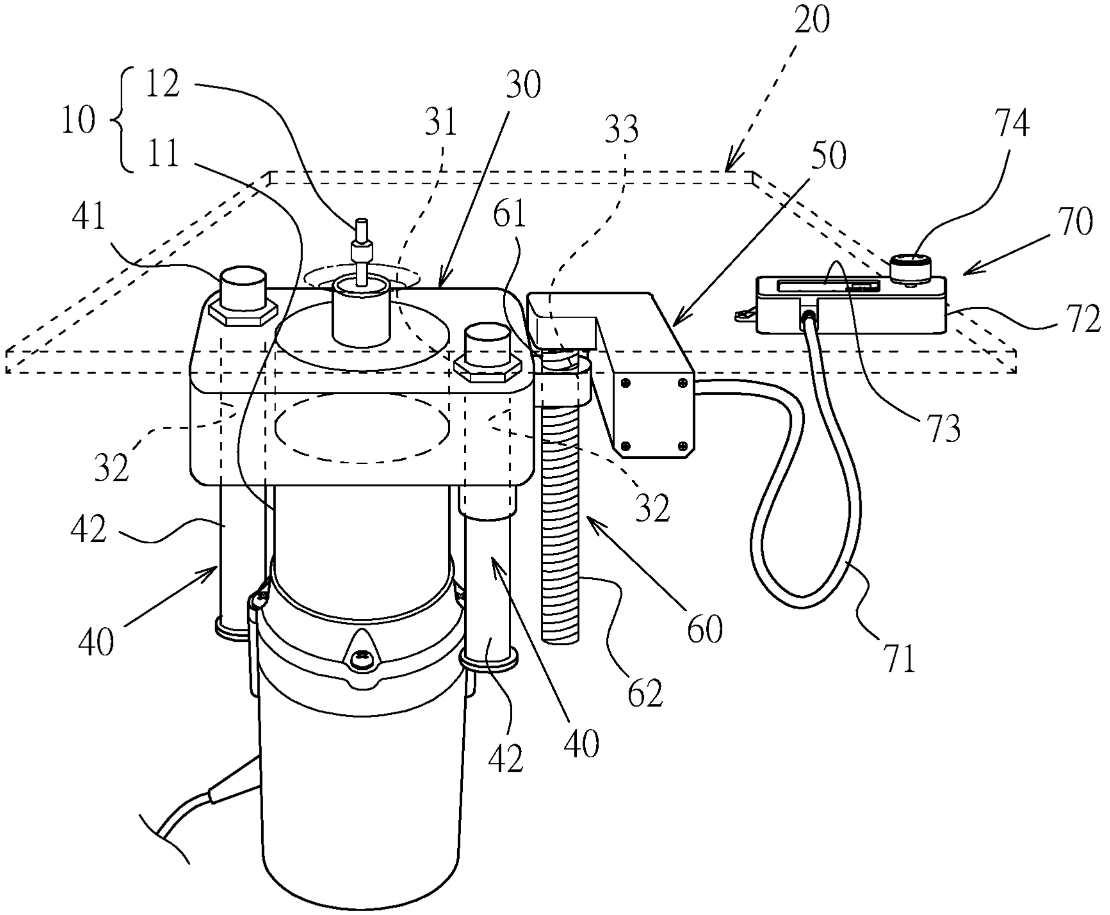
FIG. 1 is the combined stereogram of a preferred embodiment of the present invention (Note: the working table is perspective).

Please refer to FIGS. 1, 2, 3 and 4, which are the preferred embodiments of the intuitive electric lifting device for woodworking trimming machine of the present invention, but these embodiments are for illustration only, the patent application is not limited to this structure.

The intuitive electric lifting device is used for assembling a woodworking trimming machine 10 on a working table 20, so as to adjust and identify the feed state of the woodworking trimming machine 10. The woodworking trimming machine 10 comprises a machine body 11 and a rotary cutter 12. The intuitive electric lifting device comprises an assembly base 30, including an assembly part 31 facing the bottom of the working table 20, a plurality of guide sliding holes 32 and a screw hole 33 arranged of the assembly part 31. A plurality of guide support rods 40 are provided. Each of the guide support rods 40 has a positioning end 41 and a protruding section 42, wherein the positioning end 41 is fixed to the bottom of the working table 20, the protruding section 42 extends from the bottom of the working table 20 to a set length, and the guide sliding holes 32 of the assembly base 30 are respectively fitted over the protruding sections 42 of the guide support rods 40. A driving motor 50 is assembled on the bottom of the working table 20. A screw 60 with a driven end 61 and an extension rod section 62 are provided, wherein the driven end 61 is connected to the driving motor 50, the extension rod section 62 extends from the bottom of the working table 20 to a length, and the length matches the set length of the protruding section 42, and the screw hole 33 at the assembly base 30 is screwed in the extension rod section 62. An intuitive control interface 70 is electrically connected to the driving motor 50 through a signal line 71. The intuitive control interface 70 comprises a casing 72, a display touch interface 73 and a rotary-push button 74, wherein the casing 72 has a control side 725, the display touch interface 73 is arranged on the control side 725, the rotary-push button 74 is arranged on one side of the display touch interface 73, protruding from the control side 725, the up/down value is adjusted when the rotary-push button 74*n* is rotated, and the action is executed or canceled when it is pressed. The display touch interface 73 includes a mode switching unit 75, a continuous up key 76 and a continuous down key 77. A real-time interaction dialog box 80 specifically displays the adjusted values according to the selected control mode of the display touch interface 73 and the rotation information of the rotary-push button 74 in the control mode.

Figure 2:
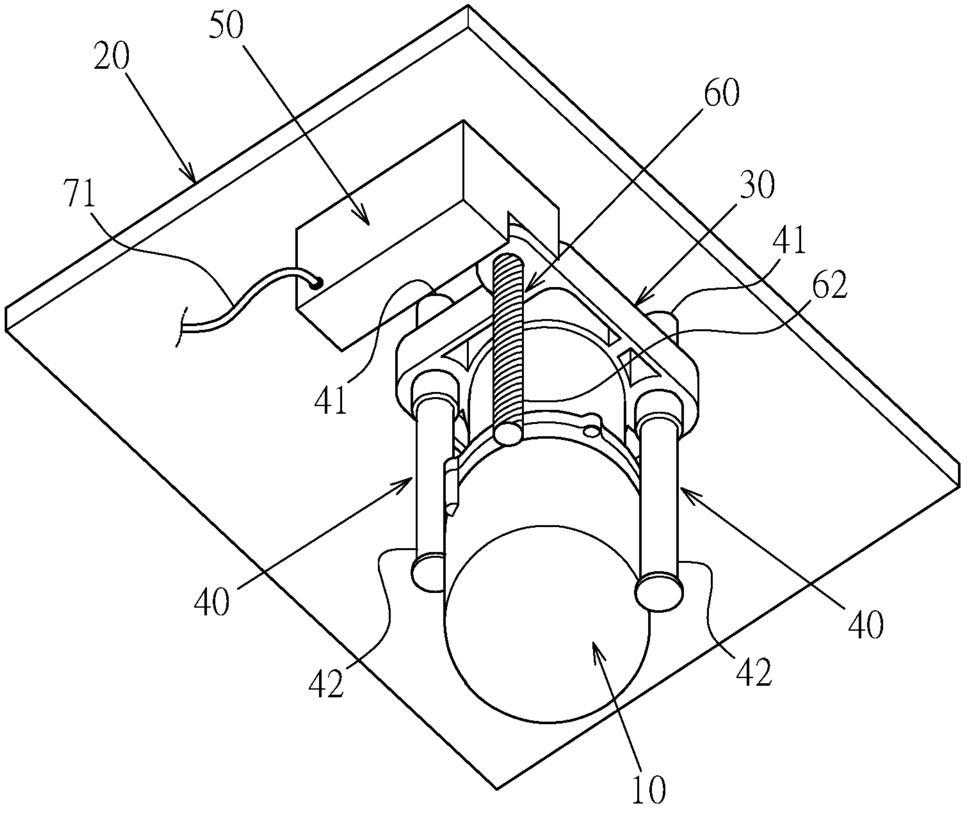
FIG. 2 is the stereogram in the upward view of a preferred embodiment of the present invention.
Figure 3:
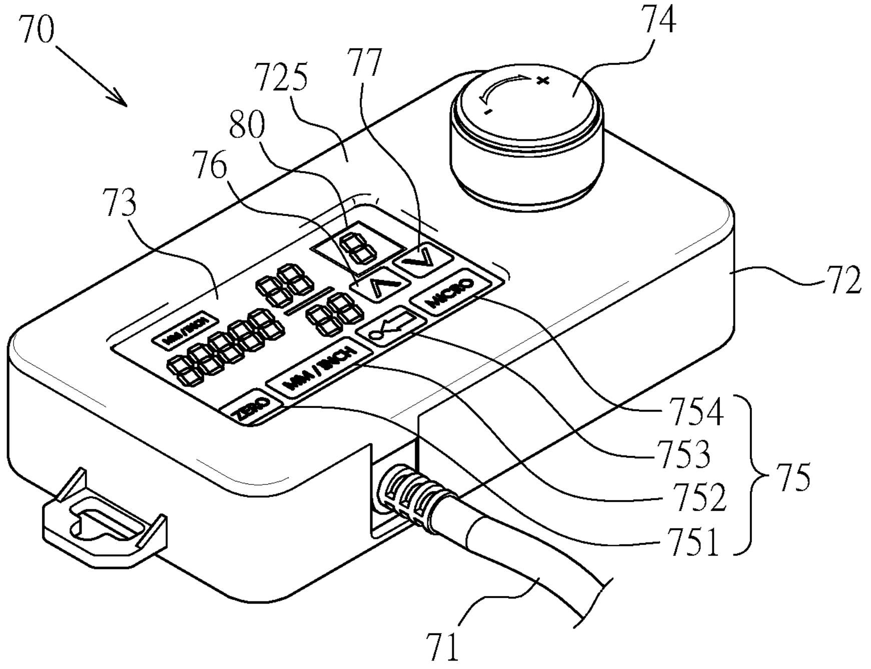
FIG. 3 is the stereogram of the intuitive control interface in a preferred embodiment of the present invention.
Figure 4:
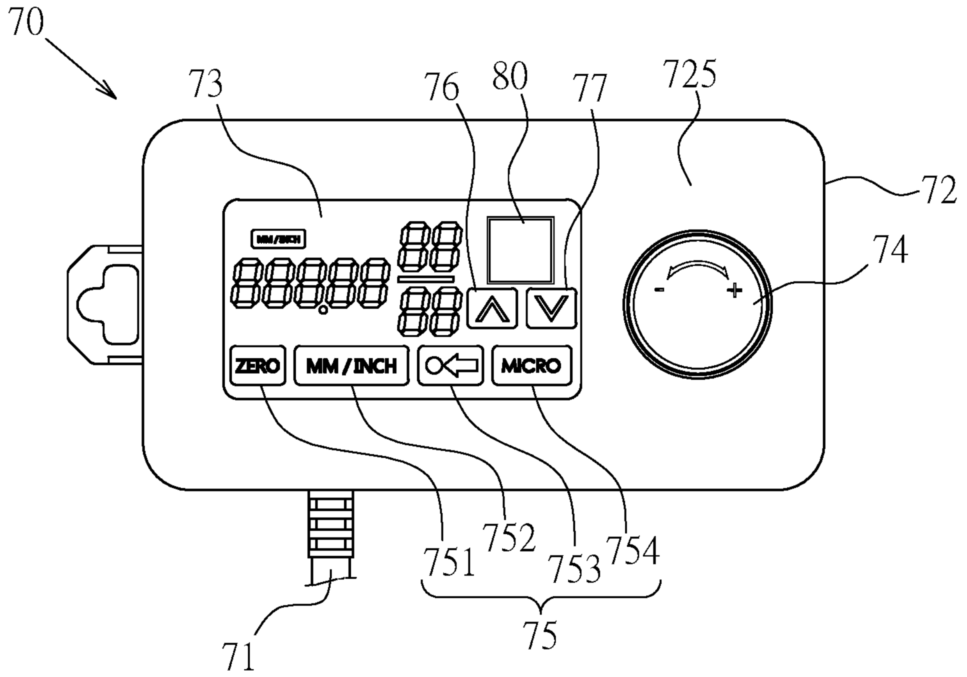
FIG. 4 is the plan of the intuitive control interface in a preferred embodiment of the present invention.

As shown in FIG. 2 and FIG. 3, in this case, the mode switching unit 75 includes a zero setting key 751, a metric/British system switching key 752, a return-to-zero key 753 and a fine-tuning mode key 754.

As shown in FIG. 1, in this case, the intuitive control interface 70 is assembled on the working table 20.

Wherein the intuitive control interface 70 is assembled on the working table 20 in any one of the following forms: bolt locking, buckling, sticking or magnetism.

Figure 5:
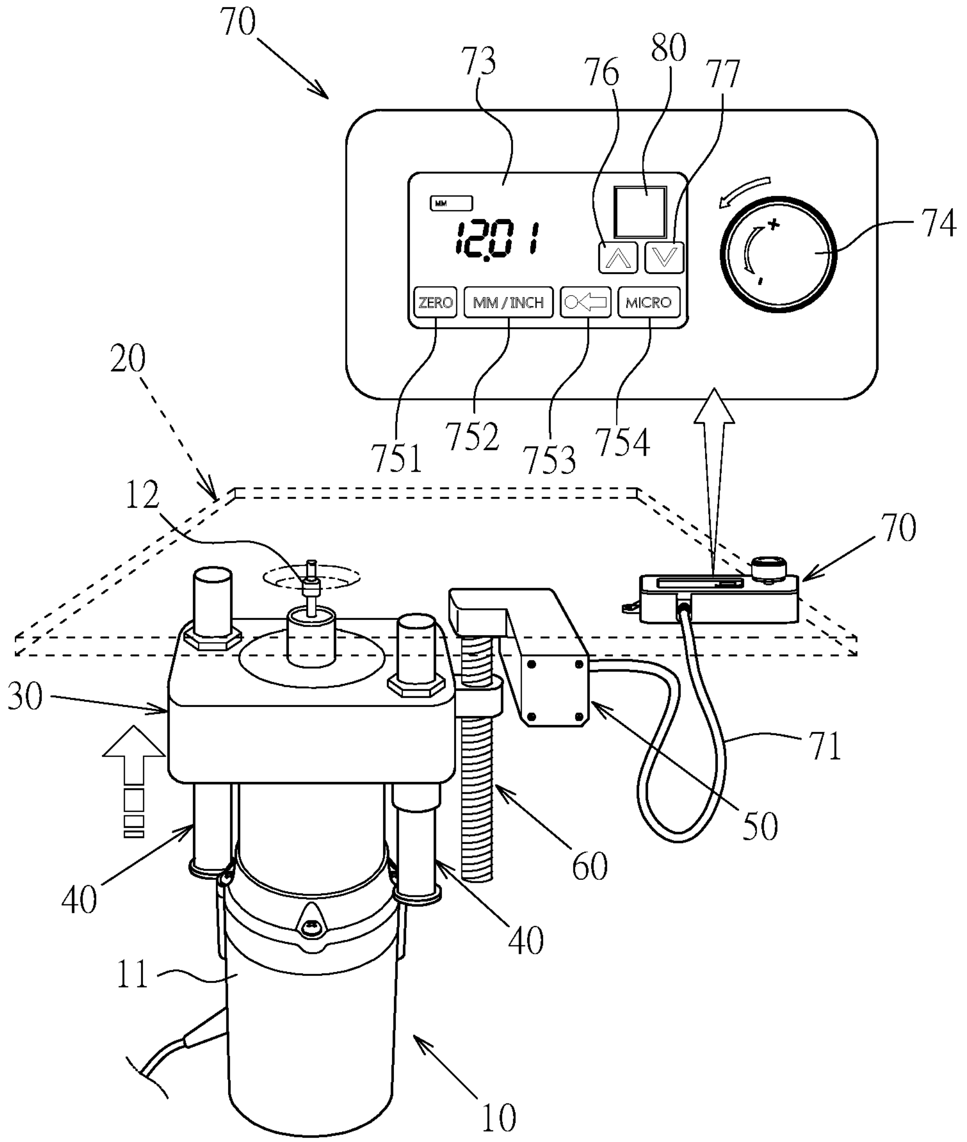
FIG. 5 is the schematic diagram I of the operating state in a preferred embodiment of the present invention.
Figure 6:
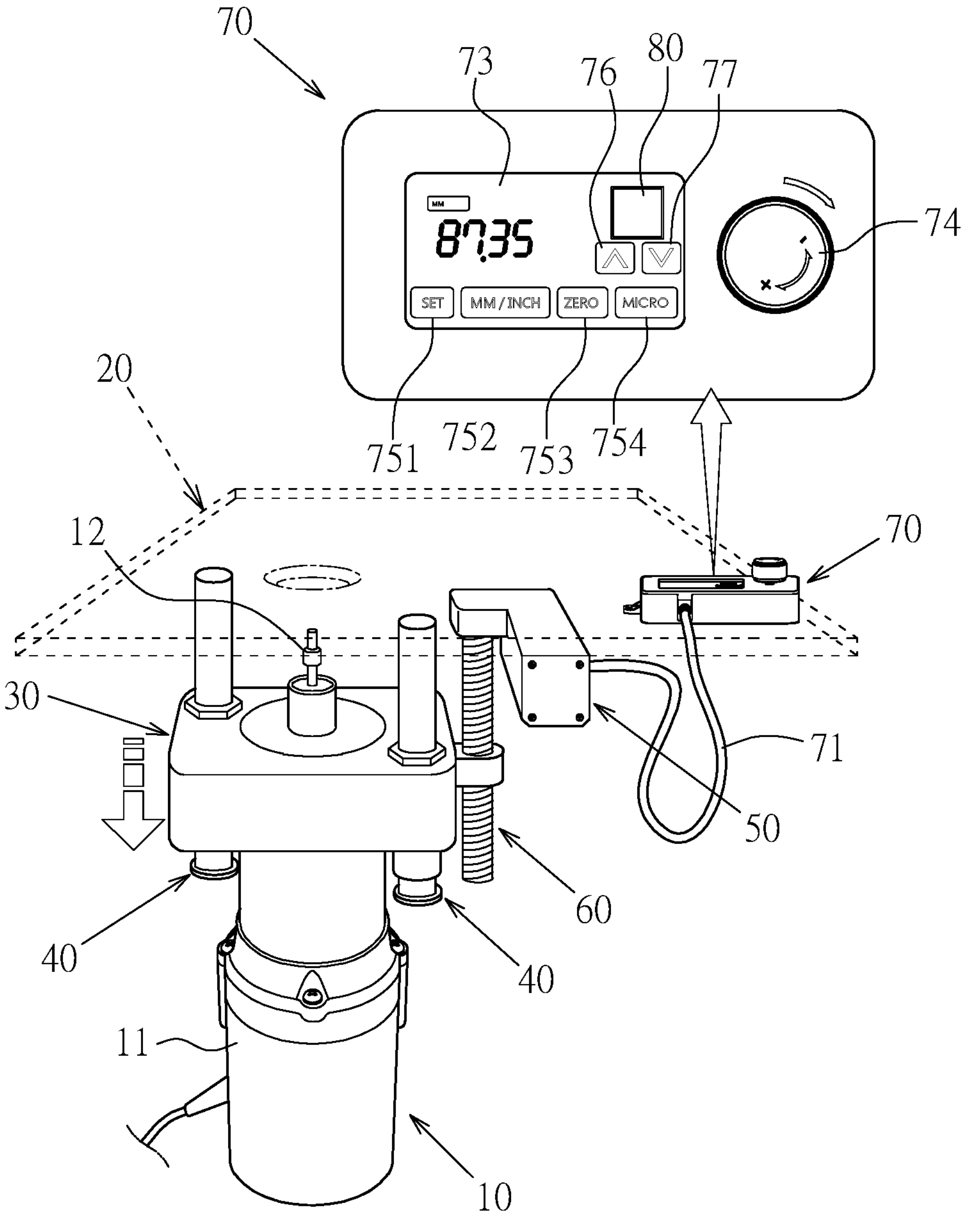
FIG. 6 is the schematic diagram II of the operating state in a preferred embodiment of the present invention.

Based on said structural composition type and technical features, in terms of the use of the intuitive electric lifting device disclosed in the present invention, the intuitive control interface 70 provides the user with an interface which is easier to identify and control. For example, the user can select metric system or British system for the unit of the displayed values through the metric-British switching key 752, so as to obtain a suitable unit identification effect, and then lower the rotary tool 12 of the woodworking trimming machine 10 to the lowest position through the continuous down key 77, and press the continuous up key 76 to set the zero point of the workpiece. When the zero position of processing is determined, the zero setting key 751 is pressed for positioning, when the rotary tool 12 is to be changed, the rotary tool 12 can be lifted to the highest position by pressing the continuous up key 76. The rotary-push button 74 provides the user with an intuitive and convenient control mode, the values are adjusted when it is rotated, according to the state difference shown in FIG. 5 and FIG. 6, the rotary tool 12 is lifted or lowered by rotating the rotary-push button 74 forward and backward. The rotary-push button 74 is pressed to execute or cancel action, the basic adjustment operation of processing wood workpieces is completed.

It is worth mentioning that the real-time interaction dialog box 80 is used to display the adjustment mode selected by the user and display the rotation information of the dual-purpose knob 74 according to the adjustment mode, and the user specifies the change value and press the dual-purpose button 74 to perform the action, so that the user can first identify whether the position of the mode is correct, so as to effectively avoid mistakes in the adjustment operation process. It can be seen that the present invention can achieve the advantage of greatly improving the convenience of woodworking trimming machine.

I claim:

1. An electric lifting device for a woodworking trimming machine, the electric lifting device is used for assembling a woodworking trimming machine on a working table, so as to adjust and identify a feed state of the woodworking trimming machine, the woodworking trimming machine includes a machine body and a rotary tool; the electric lifting device comprises:

an assembly base, including an assembly part configured to face a bottom of the working table, a plurality of guide sliding holes and a screw hole arranged in the assembly part;

a plurality of guide support rods, each of the guide support rods has a positioning end and a protruding section, wherein the positioning end is configured to be fixed to the bottom of the working table, the protruding section is configured to extend from the bottom of the working table to a set length, and the guide sliding holes of the assembly base are respectively fitted over the protruding sections of the guide support rods;

a driving motor configured to be mounted to the bottom of the working table;

a screw including a driven end and an extension rod section, wherein the driven end is connected to the driving motor, the extension rod section is configured to extend from the bottom of the working table to a length, and the length matches the set length of the protruding sections, and the extension rod section is threaded into the screw hole of the assembly base;

an control interface, which is electrically connected to the driving motor through a signal line, the control interface comprises a casing, a display touch interface and a rotary-push button, wherein the casing has a control side, the display touch interface is arranged on the control side, the rotary-push button is arranged on one side of the display touch interface, protruding from the control side, values are adjusted when the rotary-push button is rotated, and an action is executed or canceled when the rotary-push button is pressed, the display touch interface includes a mode switching unit, a continuous-up key and a continuous-down key; and a real-time interaction dialog box, which specifically displays adjusted values according to a selected control mode of the display touch interface and rotation information of the rotary-push button in the selected control mode.

2. The electric lifting device for a woodworking trimming machine defined in claim 1, wherein the mode switching unit includes a zero-setting key, a metric/British system switching key, a return-to-zero key and a fine-tuning mode key.

* * * * *